(12) United States Patent
Wei et al.

(10) Patent No.: US 10,035,946 B2
(45) Date of Patent: Jul. 31, 2018

(54) HYDRAZIDE CROSSLINKED POLYMER EMULSIONS FOR USE IN CRUDE OIL RECOVERY

(71) Applicant: Ecolab USA Inc., St. Paul, MN (US)

(72) Inventors: Mingli Wei, Naperville, IL (US); Kevin McDonald, Oak Park, IL (US); Weiguo Cheng, Naperville, IL (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/440,966

(22) Filed: Feb. 23, 2017

(65) Prior Publication Data

US 2017/0240799 A1 Aug. 24, 2017

Related U.S. Application Data

(60) Provisional application No. 62/298,694, filed on Feb. 23, 2016.

(51) Int. Cl.
| | | |
|---|---|---|
| *E21B 43/22* | (2006.01) | |
| *C09K 8/588* | (2006.01) | |
| *C08F 220/56* | (2006.01) | |
| *E21B 43/20* | (2006.01) | |

(52) U.S. Cl.
CPC ............ *C09K 8/588* (2013.01); *C08F 220/56* (2013.01); *E21B 43/20* (2013.01)

(58) Field of Classification Search
CPC ...... C09K 8/512; C09K 8/5083; C09K 8/887; C09K 8/882; C09K 8/685; E21B 43/25; E21B 43/26; E21B 43/255; E21B 33/138; E21B 43/16; E21B 43/267
See application file for complete search history.

(56) References Cited

U.S. PATENT DOCUMENTS

| | | |
|---|---|---|
| 912,065 A | 2/1909 | Bostrom |
| 3,247,171 A | 4/1966 | Walker et al. |
| 3,551,384 A | 12/1970 | Zeh, Jr. |
| 3,938,594 A | 2/1976 | Rhudy et al. |
| 3,953,342 A | 4/1976 | Martin et al. |
| 4,137,182 A | 1/1979 | Golinkin |
| 4,250,070 A | 2/1981 | Ley et al. |
| 4,728,696 A | 3/1988 | Van Phung et al. |
| 4,779,680 A | 10/1988 | Sydansk |
| 4,842,071 A | 6/1989 | Zaitoun et al. |
| 4,872,071 A | 10/1989 | Easton et al. |
| 4,954,538 A | 9/1990 | Dauplaise et al. |
| 4,970,340 A | 11/1990 | Smith |
| 5,130,479 A | 7/1992 | Ulbrich et al. |
| 5,447,199 A | 9/1995 | Dawson et al. |
| 5,840,804 A | 11/1998 | Carl et al. |
| 5,883,210 A | 3/1999 | Ahmed et al. |
| 6,235,150 B1 | 5/2001 | Middleton et al. |
| 6,302,209 B1 | 10/2001 | Thompson, Sr. et al. |
| 6,454,003 B1 | 9/2002 | Chang et al. |
| 6,592,718 B1 | 7/2003 | Wong Shing et al. |
| 6,729,402 B2 | 5/2004 | Chang et al. |
| 6,984,705 B2 | 1/2006 | Chang et al. |
| 7,250,448 B2 | 7/2007 | Walchuk et al. |
| 7,300,973 B2 | 11/2007 | Chang et al. |
| 7,482,310 B1 | 1/2009 | Reese et al. |
| 7,531,600 B1 | 5/2009 | Rey |
| 7,700,702 B2 | 4/2010 | Gaillard et al. |
| 7,833,944 B2 | 11/2010 | Munoz et al. |
| 7,888,296 B2 | 2/2011 | Gaillard et al. |
| 7,897,546 B2 | 3/2011 | Showalter et al. |
| 7,902,127 B2 | 3/2011 | Kurian et al. |
| 7,928,042 B2 | 4/2011 | Reed et al. |
| 7,947,630 B2 | 5/2011 | Atkins et al. |
| 7,989,401 B2 | 8/2011 | Kurian et al. |
| 8,152,962 B2 | 4/2012 | Koch et al. |
| 8,613,832 B2 | 12/2013 | Nyander et al. |
| 8,871,692 B2 | 10/2014 | Favero et al. |
| 9,120,965 B2 | 9/2015 | Kurian et al. |
| 2003/0150575 A1 | 8/2003 | Hund et al. |
| 2003/0168192 A1 | 9/2003 | Mohammed |
| 2004/0040683 A1 | 3/2004 | Hund et al. |
| 2004/0209780 A1 | 10/2004 | Harris et al. |
| 2005/0150622 A1 | 7/2005 | Hund et al. |
| 2005/0161182 A1 | 7/2005 | Capwell |

(Continued)

FOREIGN PATENT DOCUMENTS

| | | |
|---|---|---|
| CN | 101148582 A | 3/2008 |
| CN | 103387637 A | 11/2013 |

(Continued)

OTHER PUBLICATIONS

CAS Database List, CAS No. 58477-85-3 "N,N'-diallyl-L-tartardiamide", 3 pages.
Tillet, G., et al., "Chemical Reactions of Polymer Crosslinking and Post-Crosslinking at Room and Medium Temperature," Progress in Polymer Science, 2011, pp. 191-217, vol. 36.
Kot, E. et al., SPE 141257—Novel Drag-Reducing Agents for Fracturing Treatments Based on Polyacrylamide Containing Weak Labile Links in the Polymer Backbone (2011), Society of Petroleum Engineers, 11 pages.
CAS Database List—Chemical Book, N,N'-Diallyl-L-Tartardiamide, http://www.chemicalbook.com/ChemicalProductProperty_EN_CB1680601.html, Jun. 5, 2015, 3 pages.
Kot, E. et al., Novel Drag-Reducing Agents for Fracturing Treatments Based on Polyacrylamide Containing Weak Labile Links in the Polymer Backbone, Society of Petroleum Engineers 141257 (2011), 11 pages.

(Continued)

*Primary Examiner* — Zakiya W Bates
(74) *Attorney, Agent, or Firm* — Senniger Powers LLP

(57) ABSTRACT

Emulsions of mobility control polymers can be used to increase recovery of crude oil from a subterranean hydrocarbon-containing formation. A flooding fluid comprising the polymer emulsions are injected into a well that is in contact with the subterranean hydrocarbon-containing formation. The polymers can be temporarily cross-linked via hydrolyzable crosslinking moieties derived from a multifunctional hydrazide, a multifunctional amine, a multifunctional hydroxylamine, or a combination thereof and have improved injectivity into the well; the improved injectivity can be measured in terms of the flooding fluid's filter ratio, flow rate, and viscosity.

19 Claims, 6 Drawing Sheets

(56) References Cited

U.S. PATENT DOCUMENTS

| | | |
|---|---|---|
| 2005/0272889 A1 | 12/2005 | Kiyosada et al. |
| 2006/0030493 A1 | 2/2006 | Segura |
| 2006/0142476 A1 | 6/2006 | Weerawama |
| 2006/0243407 A1 | 11/2006 | Hund et al. |
| 2006/0270801 A1 | 11/2006 | Hagiopol et al. |
| 2007/0277981 A1 | 12/2007 | Robb et al. |
| 2009/0283232 A1 | 11/2009 | Hund et al. |
| 2010/0234251 A1 | 9/2010 | Robb et al. |
| 2011/0024128 A1 | 2/2011 | Kaminsky |
| 2011/0136704 A1 | 6/2011 | Sharma et al. |
| 2011/0155339 A1 | 6/2011 | Brungardt et al. |
| 2011/0247775 A1 | 10/2011 | Sutman et al. |
| 2012/0037364 A1 | 2/2012 | Guan et al. |
| 2012/0058922 A1 | 3/2012 | Favero et al. |
| 2012/0142847 A1 | 6/2012 | Yang et al. |
| 2012/0264888 A1 | 10/2012 | Gu et al. |
| 2013/0005616 A1 | 1/2013 | Gaillard et al. |
| 2014/0102707 A1 | 4/2014 | Moradi-Araghi et al. |
| 2014/0144628 A1 | 5/2014 | Moradi-Araghi et al. |
| 2014/0174683 A1 | 6/2014 | Nyander et al. |
| 2014/0209304 A1 | 7/2014 | Reed et al. |
| 2014/0262090 A1 | 9/2014 | Brotherson et al. |
| 2014/0309368 A1 | 10/2014 | Blondel et al. |
| 2014/0323635 A1 | 10/2014 | Yang et al. |
| 2015/0267350 A1 | 9/2015 | Brotherson et al. |
| 2015/0337078 A1 | 11/2015 | Cochran et al. |
| 2016/0347985 A1 | 12/2016 | Li et al. |

FOREIGN PATENT DOCUMENTS

| | | |
|---|---|---|
| EP | 0 539 289 B1 | 10/1996 |
| EP | 1 069 140 A1 | 1/2001 |
| EP | 1 207 267 A1 | 5/2002 |
| JP | 2011-226042 A | 11/2011 |
| WO | 2009/015255 A2 | 1/2009 |
| WO | 2009/131982 A1 | 10/2009 |
| WO | 2010/133258 A1 | 11/2010 |

OTHER PUBLICATIONS

Tillet, Guillaume et al., Chemical reactions of polymer crosslinking and post-crosslinking at room and medium temperature, Progress in Polymer Science 36 (2011) pp. 191-217.

Xiaorong, Yu et al., Degradable cross-linked polymeric microsphere for enhanced oil recovery applications, Royal Society of Chemistry Advances (2015) vol. 5, pp. 62752-62762.

International Search Report relating to PCT Application No. PCT/US2017/019096 dated May 22, 2017, 6 pages.

Written Opinion relating to PCT Application No. PCT/US2017/019096 dated May 22, 2017, 8 pages.

Smith, Michael H. et al., Network Deconstruction Reveals Network Structure in Responsive Microgels, The Journal of Physical Chemistry B, 2011, 115(14), pp. 3761-3764.

HYDRAZIDE CROSSLINKED POLYMER EMULSIONS FOR USE IN CRUDE OIL RECOVERY

CROSS-REFERENCE TO RELATED APPLICATION

This application claims priority to U.S. Provisional Patent Application Ser. No. 62/298,694 filed on Feb. 23, 2016, the disclosure of which is incorporated herein by reference in its entirety.

FIELD OF THE INVENTION

The present invention generally relates to improved emulsions of mobility control polymers that can be used to increase recovery of crude oil from a subterranean hydrocarbon-containing formation.

BACKGROUND OF THE INVENTION

In the recovery of oil from oil-bearing reservoirs, it is typically possible to recover only minor portions of the original oil in place by primary recovery methods which utilize only the natural forces present in the reservoir. Thus, a variety of supplemental techniques have been developed and used to increase oil recovery. A commonly used secondary technique is waterflooding, which involves injection of water into the oil reservoir. As the water moves through the reservoir, it displaces the oil to one or more production wells where the oil is recovered.

One problem encountered with waterflooding operations is the relatively poor sweep efficiency of the water, i.e., the water can channel through certain portions of the reservoir as it travels from the injection well(s) to the production well(s), thereby bypassing other portions of the reservoir. Poor sweep efficiency can be due, for example, to differences in the mobility of the water versus that of the oil, and permeability variations within the reservoir, which encourage flow through some portions of the reservoir and not others.

Various enhanced oil recovery techniques have been used to improve sweep efficiency. Aqueous solutions containing high molecular weight, water-soluble polymers have been employed to improve sweep efficiency. These media are more viscous than ordinary water or brine, but often undergo molecular weight breakdown, degradation due to temperature, high shear, oxidative stress, and physical force of the wellbore. The degradation leads to reduced viscosity and reduced secondary and tertiary recovery rates of oil from subterranean formations. Flooding fluids having improved injectivity into the well, measured in terms of the flooding fluid's filter ratio, flow rate, and viscosity are needed.

SUMMARY OF THE INVENTION

One aspect of the invention is directed to increasing recovery of crude oil from a subterranean hydrocarbon containing formation. The method comprises injecting an aqueous flooding fluid into a well that is in contact with the subterranean hydrocarbon-containing formation, the aqueous flooding fluid comprising injection water and a mobility control agent. The mobility control agent comprises a crosslinked water-soluble polymer wherein the crosslinking units are derived from a multifunctional hydrazide, a multifunctional amine, a multifunctional hydroxylamine, or a combination thereof, and degrade to form a water-soluble polymer having fewer crosslinks.

Another aspect of the invention is a composition comprising water and a crosslinked water-soluble polymer, wherein the crosslinked water-soluble polymer is derived from a multifunctional hydrazide and a carbonyl functionality present in a water-soluble polymer, and the weight number average molecular weight of an uncrosslinked water-soluble polymer is from about 5 MDa to about 20 MDa as determined by multi-angle light scattering (MALS).

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
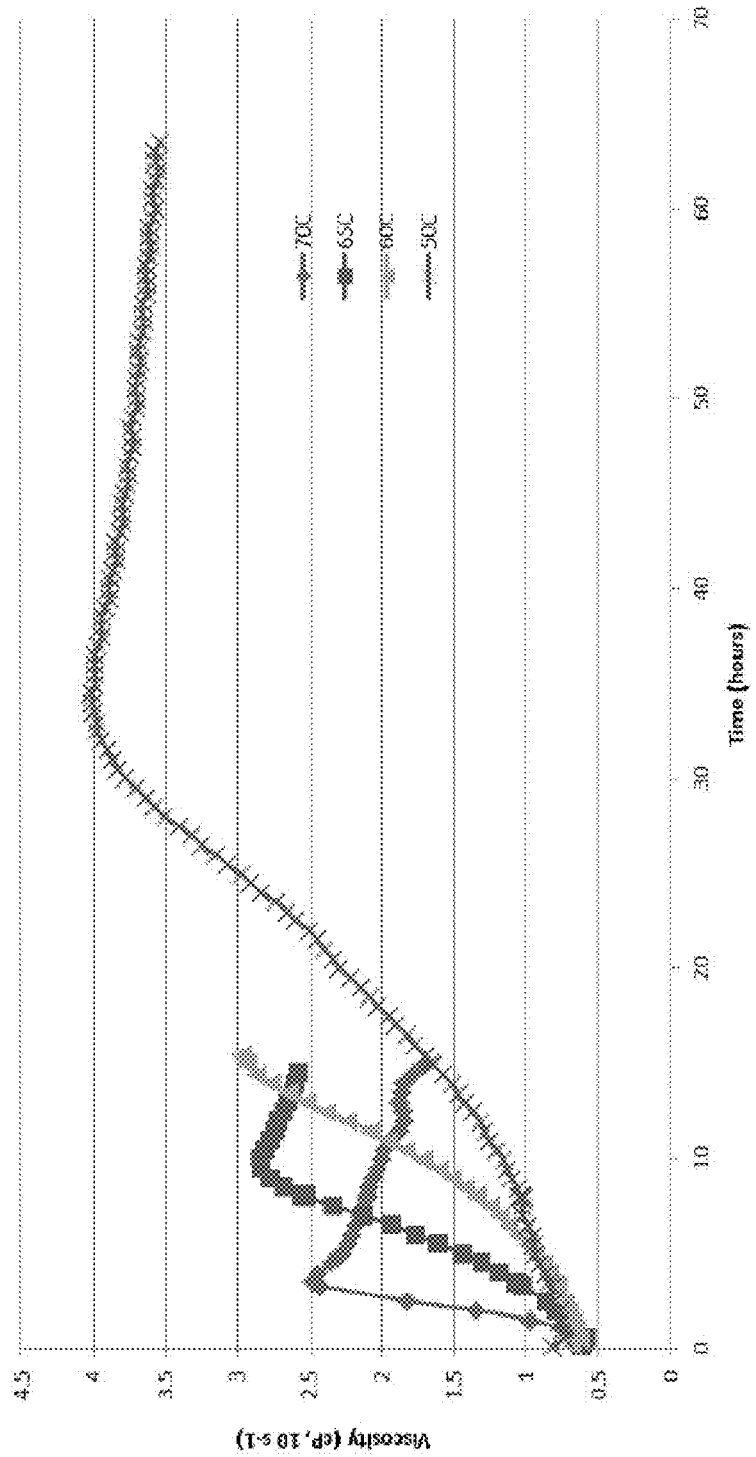
FIG. 1 is a graph of viscosity at 10 $s^{-1}$ (cP) versus time in hours for product A (1000 ppm polymer, synthetic sea water) at various temperatures.

The viscosity of an aqueous flooding fluid comprising these mobility control polymers can be increased by triggering the degradation of the crosslinks to form a water-soluble polymer having fewer crosslinks. The degradation of the crosslinks can be triggered by a change in various conditions, including a change in temperature, pH, concentration, salinity, redox potential, or exposure to light. The mobility control polymers can be used in methods for increasing recovery of crude oil from a subterranean hydrocarbon containing formation. The mobility control polymers increase viscosity by breaking the crosslinks to form a water-soluble polymer having fewer crosslinks or being substantially free of crosslinks. The water-soluble polymers having fewer crosslinks or no crosslinks make the aqueous flooding fluid have an increased viscosity as compared to the aqueous flooding fluid comprising the crosslinked water-soluble polymer.

The methods for increasing recovery of crude oil from a subterranean hydrocarbon containing formation can comprises injecting an aqueous flooding fluid into a well that is in contact with the subterranean hydrocarbon-containing formation. The aqueous flooding fluid can comprise injection water and a mobility control agent. The mobility control agent can comprises a crosslinked water-soluble polymer, wherein the crosslinking units are derived from a multifunctional hydrazide, a multifunctional amine, a multifunctional hydroxylamine, or a combination thereof and degrade to form the water-soluble polymer having fewer crosslinks.

The mechanism of crosslink degradation in the water-soluble polymer can occur via hydrolysis, acid catalysis, base catalysis, enzymatic catalysis, oxidation, reduction, electrolysis, cycloaddition, or cycloreversion of the crosslinks.

The crosslinking units of the crosslinked water-soluble polymer can be derived from a multifunctional hydrazide.

The crosslinked water-soluble polymer comprises a carbonyl group, and the crosslinks within the crosslinked water-soluble polymer can be derived from reaction of the multifunctional hydrazide with the carbonyl group of the water-soluble polymer. The crosslinks can be degraded after the aqueous flooding fluid comprising the crosslinked water-soluble polymer is contacted with the hydrocarbon containing formation to form the aqueous flooding fluid comprising the water-soluble polymer having fewer crosslinks.

The aqueous flooding fluid comprising the water-soluble polymer with fewer crosslinks can have a higher viscosity than the aqueous flooding fluid that comprises the crosslinked water-soluble polymer.

The multifunctional hydrazide can be carbohydrazide, oxalic acid dihydrazide, malonic acid dihydrazide, glutaric acid dihydrazide, succinic acid dihydrazide, adipic acid dihydrazide, sebacic acid dihydrazide, maleic acid dihydrazide, fumaric acid dihydrazide, itaconic acid dihydrazide, terephthalic acid dihydrazide, isophthalic acid dihydrazide, puromellitic acid dihydrazide, citric trihydrazide, nitriloacetic trihydrazide, 1,2,4-benzene trihydrazide, ethylenediamine tetraacetic acid tetrahydrazide, 1,4,5,8-naphthoic acid tetrahydrazide, or a combination thereof.

The crosslinked water-soluble polymer can comprise crosslinking units derived from a hydrazide corresponding to Formulae I or II:

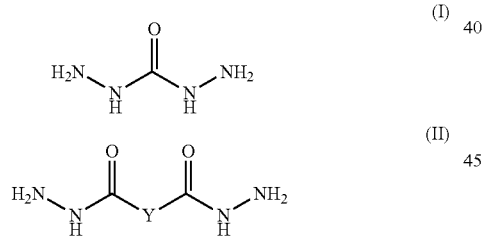

wherein Y is a bond, $C_2$-$C_{18}$ alkylene, or $C_2$-$C_{18}$ alkenylene, arylene, or alkarylene.

Additionally, the compound of Formulae I or II can have Y be a bond or $C_2$-$C_{18}$ alkylene.

The compound of Formulae I or II can have Y be arylene.

The compound of Formulae I or II can have Y be alkarylene.

Further, the compound of Formulae I or II can have Y comprise a bond.

The compound of Formulae I or II can have Y comprise $C_2$-$C_8$ alkylene.

Additionally, the compound of Formulae I or II can have Y comprise ethylene, propylene, butylene, pentylene, or hexylene. Preferably, the compound of Formulae I or II can have Y comprise ethylene or butylene.

The crosslinked water-soluble polymer can comprise a repeat unit derived from acrylic acid, an acrylic acid salt, a methacrylic acid salt, methacrylic acid, diacetone acrylamide, acrylamide, methacrylamide, a 2-acrylamido-2-methylpropane sulfonic acid salt, styrene sulfonic acid salt, or 2-(acryloyloxy)-N,N,N-trimethylethanaminium salt, N,N-dimethylaminoethyl acrylate methyl chloride quaternary salt, N,N-dimethylaminoethyl methacrylate methyl chloride quaternary salt, N,N-dimethylaminopropyl acrylamide methyl chloride quaternary salt, N,N-dimethylaminopropyl methacrylamide methyl chloride quaternary salt, N-vinylformamide, N-vinylpyrrolidinone, diallyldimethyl ammonium chloride, or a combination thereof.

The crosslinked water-soluble polymer can comprise a repeat unit derived from acrylic acid, an acrylic acid salt, a methacrylic acid salt, methacrylic acid, diacetone acrylamide, acrylamide, a 2-acrylamido-2-methylpropane sulfonic acid salt, or a combination thereof.

Preferably, the crosslinked water-soluble polymer can comprise a repeat unit derived from acrylic acid, an acrylic acid salt, diacetone acrylamide, acrylamide, a 2-acrylamido-2-methylpropane sulfonic acid salt, or a combination thereof.

Preferably, the crosslinks of the crosslinked water-soluble polymer can be hydrolyzed, and cause an increase in the viscosity of the aqueous flooding fluid when is contacted with the subterranean hydrocarbon-containing formation.

The crosslinking moieties can degrade by hydrolysis and can be covalently bonded.

The invention can comprise a crosslinked polymer wherein the polymer is derived from a 2-acrylamido-2-methylpropane sulfonic acid salt, a styrene sulfonic acid salt, 2-(acryloyloxy)-N,N,N-trimethylethanaminium salt, N,N-dimethylaminoethyl acrylate methyl chloride quaternary salt, N,N-dimethylaminoethyl methacrylate methyl chloride quaternary salt, N,N-dimethylaminopropyl acrylamide methyl chloride quaternary salt, N,N-dimethylaminopropyl methacrylamide methyl chloride quaternary salt, N-vinylformamide, N-vinylpyrrolidinone, diallyldimethyl ammonium chloride, or a combination thereof; and the crosslinking units are derived from a hydrazide corresponding to Formulae I or II:

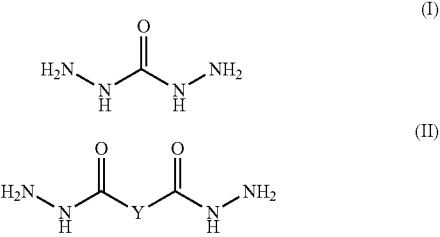

wherein Y is a bond, $C_2$-$C_{18}$ alkylene, or $C_2$-$C_{18}$ alkenylene, arylene, or alkarylene Further, the invention can comprise a crosslinked polymer wherein the polymer is derived from a 2-acrylamido-2-methylpropane sulfonic acid salt, a styrene sulfonic acid salt, or a combination thereof; and the crosslinking units are derived from a hydrazide corresponding to Formulae I or II:

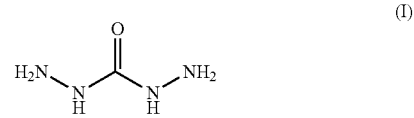

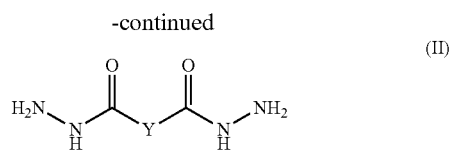

(II)

wherein Y is a bond, $C_2$-$C_{18}$ alkylene, or $C_2$-$C_{18}$ alkenylene, arylene, or alkarylene.

The water-soluble polymer can comprise from about 0.1 ppm to about 2000 ppm, from about 0.1 ppm to about 1800 ppm, from about 0.1 ppm to about 1600 ppm, from about 0.1 ppm to about 1400 ppm, from about 0.1 ppm to about 1200 ppm, from about 0.1 ppm to about 1000 ppm, from about 10 ppm to about 2000 ppm, from about 10 ppm to about 1500 ppm, from about 10 ppm to about 1000 ppm, from about 20 ppm to about 2000 ppm, from about 20 ppm to about 1500 ppm, from about 20 ppm to about 1000 ppm covalently bonded crosslinking units based on the total weight of the water-soluble polymer.

The weight average molecular weight of the uncrosslinked water-soluble polymer can be greater than 1 MDa.

The weight average molecular weight of the uncrosslinked water-soluble polymer can be from about 4 MDa to about 20 MDa, from about 1 MDa to about 20 MDa, from about 1 MDa to about 18 MDa, from about 1 MDa to about 16 MDa, from about 1 MDa to about 14 MDa, from about 1 MDa to about 12 MDa, from about 1 MDa to about 10 MDa, from about 1 MDa to about 8 MDa, from about 1 MDa to about 6 MDa, from about 2 MDa to about 20 MDa, from about 2 MDa to about 18 MDa, from about 2 MDa to about 16 MDa, from about 2 MDa to about 14 MDa, from about 2 MDa to about 12 MDa, from about 2 MDa to about 10 MDa, from about 2 MDa to about 8 MDa, from about 2 MDa to about 6 MDa, from about 4 MDa to about 15 MDa, from about 4 MDa to about 10 MDa, from about 4 MDa to about 8 MDa, from about 10 MDa to about 20 MDa, or from about 15 MDa to about 20 MDa.

The uncrosslinked water-soluble polymers can be substantially free of crosslinks or stated another way, the uncrosslinked water-soluble polymers have no crosslinks.

Another aspect of the invention is a mobility control composition comprising water and a crosslinked water-soluble polymer, wherein the crosslinked water-soluble polymer is derived from a multifunctional hydrazide and a carbonyl functionality present in a water-soluble polymer, and the weight number average molecular weight of an uncrosslinked water-soluble polymer is between 5,000,000 Da and 20,000,000 MDa as determined by multi-angle light scattering (MALS).

The crosslinked water-soluble polymer can be derived from reaction of a multifunctional hydrazide and a carbonyl functionality present in an uncrosslinked water-soluble polymer.

The crosslinks of the crosslinked water-soluble polymer can be derived from a multifunctional hydrazide and a carbonyl functionality present in a water-soluble polymer.

The weight number average molecular weight of the uncrosslinked water-soluble polymer is from about 5 MDa to about 20 MDa, from about 5 MDa to about 18 MDa, from about 5 MDa to about 16 MDa, from about 5 MDa to about 14 MDa, from about 5 MDa to about 12 MDa, from about 5 MDa to about 10 MDa, from about 5 MDa to about 8 MDa, from about 8 MDa to about 20 MDa, from about 8 MDa to about 15 MDa, from about 8 MDa to about 12 MDa, from about 8 MDa to about 10 MDa, from about 10 MDa to about 20 MDa, from about 10 MDa to about 15 MDa, as determined by multi-angle light scattering (MALS).

The water-soluble polymer of the mobility control composition described herein, can be an acrylamide copolymer or a polyacrylamide.

The water-soluble polymer of the mobility control composition can comprise a repeat unit derived from acrylic acid, an acrylic acid salt, a (meth)acrylic acid salt, (meth)acrylic acid, diacetone acrylamide, acrylamide, a 2-acrylamido-2-methylpropane sulfonic acid salt, or a combination thereof.

The water-soluble polymer of the mobility control composition can comprise more than 10 wt. % of the repeat unit derived from acrylic acid, an acrylic acid salt, a (meth)acrylic acid salt, (meth)acrylic acid, diacetone acrylamide, acrylamide, a 2-acrylamido-2-methylpropane sulfonic acid salt, or a combination thereof, based on the total weight of the water-soluble polymer.

The reduced specific viscosity (RSV) of a polymer is a measurement of the capacity of the polymer to increase the viscosity of the solution at a given concentration, this capacity is dependent upon the structure and composition of the polymer chains. For example, within a series of polymer homologs, the RSV of a dilute polymer solution can be an indication of polymer chain length and molecular weight. The upper limit of the RSV for the polymers used in the methods described herein is a value where the polymer can be injected into a system and pumped into the reservoir.

The RSV of the uncrosslinked water-soluble polymer can be at least 10 dL/g when measured in an Ubbelohde viscometer tube at 25° C. in 1.0 M $NaNO_3$. The RSV can be from about 10 dL/g to about 40 dL/g, from about 10 dL/g to about 35 dL/g, from about 10 dL/g to about 30 dL/g, from about 10 dL/g to about 25 dL/g, from about 15 dL/g to about 40 dL/g, from about 15 dL/g to about 35 dL/g, or from about 15 dL/g to about 30 dL/g. The reduced specific viscosity of the uncrosslinked water-soluble polymer is no more than about 40 dL/g. Preferably, the reduced specific viscosity is from 20 dL/g to about 40 dL/g.

The aqueous flooding fluid can comprise an emulsion of an aqueous phase and an oil phase, the aqueous phase comprising the crosslinked water-soluble polymer and an oil phase comprising a hydrocarbon oil and a surfactant.

Aqueous flooding fluids comprising the water-soluble polymers described above remain water-soluble following introduction into a subterranean formation. After injection into the formation, the environmental conditions of the formation cause the crosslinks in the water-soluble polymers described above to hydrolyze, providing a viscous aqueous flooding fluid. In order for the aqueous flooding fluid to improve the mobility of the oil in the formation and improve the sweep efficiency of the aqueous polymer flood, the water-soluble polymer providing viscosity to the flooding fluid must be able to move unimpeded through the formation, without blocking the pores of the formation.

The desirable function of mobility control in enhanced oil recovery stands in contrast a different, polymer-aided Enhanced Oil Recovery (EOR) application called conformance control, in which polymers are injected in to the formation with the intent of forming crosslinked gels or insoluble polymers that block some of the pores in the formation. Such blocking of the pores improves the properties of the subterranean formation, instead of improving the properties of the aqueous flooding fluid.

Mobility control polymers, such as those described above, must therefore remain water soluble and not impede the flow of the aqueous flooding fluid in the formation. A recognized laboratory test to measure the ability of an aqueous flooding fluid to move through a subterranean formation without blocking the pores of the formation is called a filter ratio test. An example of this type of test is described in The American Petroleum Institute standards RP 63. In a filter ratio test, a standard volume of an aqueous flooding fluid containing a specific concentration of polymer is passed through a filter under a constant pressure. The time required for the solution to pass through the filter is recorded after specific volumes of solution have passed through the filter. The filter ratio is calculated as the ratio of the filter time for the final portion of solution, over the filter time for the initial, equal-sized portion of solution. Ideally, the aqueous flooding fluid should pass through the filter at a constant rate throughout the test, causing no pore-blocking during filtration, so that the filter ratio should be equal to one. The actual measured filter ratio is typically above one, however, so an upper limit to the filter ratio under a specific set of conditions is normally used in order to determine the suitability of an aqueous flooding fluid for use in a mobility control application.

The aqueous flooding fluid as injected into the well can have a filter ratio of from 1 to about 1.5, from 1 to about 1.4, from 1 to about 1.3, from 1 to about 1.2, or from 1 to about 1.1, and a flow rate of at least 0.1 mL/S when the membrane filter size is 1.2 microns and the pressure is 20 psi.

The aqueous flooding fluid can comprise about 100 ppm to about 10000 ppm, from about 100 ppm to about 5000 ppm, from about 100 ppm to about 4000 ppm, from about 100 ppm to about 3000 ppm, from about 100 ppm to about 2000 ppm from about 100 ppm to about 1000 ppm, from about 500 ppm to about 10000 ppm, from about 500 ppm to about 5000 ppm, from about 500 ppm to about 3000 ppm, from about 500 ppm to about 2000 ppm, from about 750 ppm to about 5000 ppm, from about 750 ppm to about 3000 ppm, from about 750 ppm to about 2000 ppm, or from about 750 ppm to about 1500 ppm of the water-soluble polymer.

The aqueous flooding fluid can further comprise a surfactant, a biocide, an antioxidant, or a combination thereof.

Prior to injection, the aqueous flooding fluid can have a viscosity of about 0 cPs to about 100 cPs, from about 0 cPs to about 80 cPs, from about 0 cPs to about 60 cPs, from about 0 cPs to about 40 cPs, from about 0 cPs to about 20 cPs, from about 0 cPs to about 10 cPs, from about 0 cPs to about 5 cPs, from about 0 cPs to about 4 cPs, from about 0 cPs to about 2 cPs, or from about 0 cPs to about 1 cPs.

After injection, the aqueous flooding fluid can have a viscosity of about 1 cPs to about 5000 cPs, from about 1 cPs to about 2000 cPs, from about 1 cPs to about 1000 cPs, from about 1 cPs to about 500 cPs, from about 1 cPs to about 400 cPs, from about 1 cPs to about 300 cPs, from about 1 cPs to about 200 cPs, from about 1 cPs to about 100 cPs, from about 1 cPs to about 50 cPs, from about 1 cPs to about 10 cPs, from about 1 cPs to about 5 cPs, from about 2 cPs to about 5000 cPs, from about 2 cPs to about 2000 cPs, from about 2 cPs to about 1000 cPs, from about 2 cPs to about 500 cPs, from about 2 cPs to about 400 cPs, from about 2 cPs to about 300 cPs, from about 2 cPs to about 200 cPs, from about 2 cPs to about 100 cPs, from about 2 cPs to about 50 cPs, from about 2 cPs to about 10 cPs, from about 2 cPs to about 5 cPs, from about 3 cPs to about 5000 cPs, from about 3 cPs to about 2000 cPs, from about 3 cPs to about 1000 cPs, from about 3 cPs to about 500 cPs, from about 3 cPs to about 400 cPs, from about 3 cPs to about 300 cPs, from about 3 cPs to about 200 cPs, from about 3 cPs to about 100 cPs, from about 3 cPs to about 50 cPs, from about 3 cPs to about 10 cPs, or from about 3 cPs to about 5 cPs.

The aqueous flooding fluid can comprise displacing the hydrocarbon fluid in the formation into one or more production vessels.

The hydrocarbon oil can be a mineral oil, a biodiesel oil, an organic solvent, or the like.

The mobility control agent can be a low-viscosity solution resistant to viscosity degradation induced by the high shear experienced during the injection. But, once injected, the higher temperature and the longer residence time within the subterranean formation facilitates hydrolysis of the cross-linkers, which leads to an increase in viscosity of the solution, due to the increase in the hydrodynamic volume of the mobility control agents (cross-linked water-soluble polymers) that are un-cross-linked following hydrolysis. The viscosity of the resulting solution is equivalent or higher than that of a solution comprising a near-identical polymer that lacks the labile cross-links. The higher viscosity of the solution once in the formation allows for its effective use in achieving mobility control of the hydrocarbon in the formation, enhancing the secondary/tertiary recovery of hydrocarbon from the formation. The compositions of the invention thereby provide viscosities in formations after heat/time hydrolysis activation that far exceed those of previous hydrocarbon recovery polymers, which can degrade much more rapidly under the influence of shear during introduction via the wellbore.

Water-Soluble Polymers

The methods described herein comprise injection of a mobility control agent comprising a cross-linked water-soluble polymer. The cross-linked water-soluble polymers can comprise thermally labile, catalytically labile, enzymatically labile, redox labile, optically labile, pH labile, kinetically labile, biologically labile, hydrophobically labile, hydrolytically labile, or electrolytically labile cross-links.

The water-soluble polymers can be synthesized by methods known in the art, such as, for example, radical polymerization.

Further, the polymer can be prepared in the form of a dry polymer, a dispersion polymer, a solution polymer, or as an inverse emulsion polymer.

The monomer solution can be suspended in a water-immiscible solvent such as a hydrocarbon oil, along with a high molecular weight, structured surfactant as described herein. Polymerization is then initiated via the addition of a small amount of a free radical initiator.

The free radical initiators generally decompose to generate free radicals by thermal, photochemical, redox, or hybrid mechanisms. An example of a thermal initiator includes, but is not limited to, azo compounds such as 2,2'-azobisisobutyronitrile. An example of a redox initiator includes, but is not limited to, t-butylhydroperoxide/ferrous ion and ammonium persulfate/sodium bisulfite.

The polymerization reaction is most often conducted between the temperatures of about 10° C. and about 110° C.

Once the polymerization reaction is completed, an optional step can be performed in order to reduce the residual monomer content of the product. This is accomplished, when desired, by means of heating the reaction product for an additional time period, or by the addition of additional initiators or other additives that will react with the residual monomer, or by a combination of both means. Additional processing steps can be optionally performed in order to, for example, adjust the product pH, or remove water or other solvents from the reaction product in order to produce a solid polymer product. The final polymer product form is thus dictated by the choice of the formula and the processing steps employed, so that a polymer product comprised of a liquid solution, a liquid emulsion, or a dry solid can be produced.

Particularly, the labile cross-linked monomer units are broken upon exposure to a stimulus, such as a change in temperature or chemical environment (e.g., pH, concentration, or ionic strength). For example, the water-soluble polymers can be incorporated into the aqueous flooding fluid, and can undergo hydrolysis after the aqueous flooding fluid is introduced into the subterranean hydrocarbon-containing formation. The labile cross-linked monomer units can be cross-linked via a covalent hydrolyzable cross-linker, or via ionic interactions between a monomer unit bearing a charged hydrolyzable moiety and a monomer unit bearing an opposite charge or by hydrophobic interactions introduced by use of a hydrolytically labile hydrophobic monomer.

The water-soluble polymers are generally prepared by polymerizing a water-in-oil emulsion including an aqueous monomer phase and an external hydrocarbon oil phase. The monomer phase includes an aqueous mixture of a monomer described above (e.g., acrylic acid, an acrylic acid salt, a (meth)acrylic acid salt, (meth)acrylic acid, diacetone acrylamide, acrylamide, a 2-acrylamido-2-methylpropane sulfonic acid salt, or a combination thereof) and de-ionized water neutralized in an ice bath with a basic solution to pH 5.0-8.5. In addition, a chain transfer agent (e.g., sodium formate, sodium chloride, and the like) and a chelant (e.g, ethylenediamine tetraacetic acid (EDTA)) are added to the monomer phase. The crosslinker having a structure of Formulae I or II is added to the neutralized monomer phases and mixed for up to 90 minutes at 25° C. The oil phase includes a hydrocarbon oil and one or more surfactants.

The emulsion is formed by adding the monomer phase to the oil phase under agitation at from 30° C. to 60° C. and mixing for a minimum of 30 minutes.

The polymerization is initiated by addition of 2,2'-azobisisobutryonitrile and 2,2'-azobis(2,4-diemthylvaleronitrile) and purging of nitrogen at the reaction temperature of 30° C. to 60° C. After the polymerization reaction reaches greater than or equal to 85% conversion, the emulsion is post-heated at 57° C. or above for at least one hour to complete the polymerization and reduce monomer residuals. The hydrazide crosslinker could, alternatively, be added after the polymerization reaction.

The structure of the crosslinked polymer is confirmed by a combination of electrospray ionization mass spectrometry (ESI-MS) and nuclear magnetic resonance (NMR) spectroscopy.

Dissolution of the polymer emulsion in synthetic sea salt water is effected by mixing the emulsion into the sea salt water under shear, in the presence of a high hydrophilic/lipophilic balance (HLB) nonionic surfactant at a concentration of less than 10% of the weight of the emulsion polymer.

Alternatively, an ethoxylated fatty alcohol could be added directly to the polymer emulsion after cooling to room temperature. Filter ratio determination and bulk viscosity measurement can be performed following the addition of the ethoxylated fatty alcohol to ensure the crosslinked polymer is dispersed within the aqueous solution.

Methods for Recovering Hydrocarbon Fluid from Subterranean Formations

The present invention is directed to a method for increasing recovery of a crude oil from a subterranean hydrocarbon-containing formation. The method comprises injecting into the formation an aqueous flooding fluid as described herein.

In order to effectively displace the crude oil from the subterranean hydrocarbon-containing formation using the methods discussed above, the aqueous flooding fluid has a sufficiently high viscosity. When injected into a subterranean formation, a low viscosity flooding fluid can seek a path of least resistance in the reservoir rock, and can therefore bypass large quantities of oil. By increasing the viscosity to a value approaching that of the oil, the mobility of the aqueous flooding fluid is decreased and more effectively displaces the oil from the formation. The aqueous flooding fluid of the present invention therefore comprises a high molecular weight water-soluble polymer which, once activated in the subterranean formation (as will be described further below), has a large hydrodynamic volume that exerts a primary influence on the bulk viscosity of the solution. The high bulk viscosity of the flooding fluid aids the displacement of the oil from the formation, ultimately into one or more production vessels.

While a high bulk viscosity is desirable once the aqueous flooding fluid is in the subterranean hydrocarbon-containing formation, high viscosity solutions are difficult to inject into the formation at a sufficiently high rate. Thus, the injectivity of the aqueous flooding fluid is desirable as described above.

Furthermore, the water-soluble polymers can undergo significant shearing during the injection process, reducing the molecular weight and the hydrodynamic volume of the polymer, and the viscosity of the aqueous flooding fluid, which ultimately affects the displacement of oil. Thus, the aqueous flooding fluid comprises high molecular weight, shear-resistant polymers, which are temporarily crosslinked prior to injection of the aqueous flooding fluid into the subterranean formation. The emulsion droplet size advantageously affects the ability of the aqueous flooding fluid to be injected into the hydrocarbon-containing formation. These properties allow for greater ease of injection down the wellbore, and also impart significant shear resistance to the polymer.

Once the aqueous flooding fluid reaches the subterranean formations, the crosslinks hydrolyze over time, and after exposure to higher temperatures in the formation the crosslinks further hydrolyze so that the high molecular weight polymers become uncrosslinked. The release of the crosslinks results in an increase in the hydrodynamic volume, leading to a viscosity that is equal or greater than the viscosity of the aqueous flooding fluid prior to injection. The high viscosity aqueous flooding fluid can then effectively displace the hydrocarbons from the subterranean formation.

Aqueous Flooding Fluid

The aqueous flooding fluid used in the methods described herein comprises injection water and a mobility control agent. The mobility control agent comprises a crosslinked water-soluble polymer as described above.

The aqueous flooding fluid can have a viscosity of about 0 cPs to about 100 cPs before injection. After injecting the aqueous flooding fluid into the hydrocarbon-containing subterranean formation, the aqueous flooding fluid can have a viscosity of about 1 cPs to about 5000 cPs. This increase in viscosity is due to the degradation of the crosslinked water-soluble polymer to break the crosslinks to result in a water-soluble polymer that is uncrosslinked or have fewer crosslinks than the crosslinked water-soluble polymer before injection.

The aqueous flooding fluid can comprise hydrolyzable cross-linked monomer units. The hydrolyzable cross-linked monomer units are hydrolyzed after the aqueous flooding fluid is injected into the hydrocarbon-containing subterranean formation, and the viscosity of the solution following hydrolysis is about the same or higher than a viscosity of the composition prior to injection.

The water-soluble polymer can be included in an aqueous flooding fluid in an amount of about 100 ppm to about 10000 ppm. For example, the polymer can be included in the aqueous flooding fluid in an amount of about 100 ppm, 200 ppm, 300 ppm, 400 ppm, 500 ppm, 600 ppm, 700 ppm, 800 ppm, 900 ppm, 1000 ppm, 1100 ppm, 1200 ppm, 1300 ppm, 1400 ppm, 1500 ppm, 1600 ppm, 1700 ppm, 1800 ppm, 1900 ppm, 2000 ppm, 2100 ppm, 2200 ppm, 2300 ppm, 2400 ppm, 2500 ppm, 2600 ppm, 2700 ppm, 2800 ppm, 2900 ppm, 3000 ppm, 3500 ppm, 4000 ppm, 4500 ppm, 5000 ppm, 5500 ppm, 6000 ppm, 6500 ppm, 7000 ppm, 7500 ppm, 8000 ppm, 8500 ppm, 9000 ppm, 9500 ppm, or 10000 ppm. Preferably, the water-soluble polymer can be included in an aqueous flooding fluid in an amount of about 100 ppm to about 3000 ppm, from about 100 ppm to about 2500 ppm, from about 100 ppm to about 2000 ppm, from about 100 ppm to about 1800 ppm, from about 100 ppm to about 1600 ppm, from about 100 ppm to about 1400 ppm, from about 100 ppm to about 1200 ppm, or from about 100 ppm to about 1000 ppm.

Prior to injection into a subterranean formation, an aqueous flooding fluid can have a viscosity of about 0 cPs to about 100 cPs. For example, the aqueous flooding fluid can have a viscosity of about 0 cPs, 0.001 cPs, 0.01 cPs, 0.1 cPs, 0.2 cPs, 0.3 cPs, 0.4 cPs, 0.5 cPs, 0.6 cPs, 0.7 cPs, 0.8 cPs, 0.9 cPs, 1 cPs, 2 cPs, 3 cPs, 4 cPs, 5 cPs, 6 cPs, 7 cPs, 8 cPs, 9 cPs, 10 cPs, 15 cPs, 20 cPs, 25 cPs, 30 cPs, 35 cPs, 40 cPs, 45 cPs, 50 cPs, 55 cPs, 60 cPs, 65 cPs, 70 cPs, 75 cPs, 80 cPs, 85 cPs, 90 cPs, 95 cPs or 100 cPs. Further, the aqueous flooding fluid can have a viscosity from about 0.001 cPs to about 100 cPs; from about 0.01 cPs to about 100 cPs; or from about 0.1 cPs to about 20 cPs. Preferably, the aqueous flooding fluid can have a viscosity from about 0.1 cPs to about 10 cPs.

After exposure to a stimulus or a change in conditions such as temperature, pH, concentration, salt content or the like (e.g., injection into a subterranean formation, or addition to synthetic sea water), the viscosity of the aqueous flooding fluid can be about the same or higher than a viscosity of the aqueous flooding fluid prior to the stimulus, or the viscosity can be about the same or higher than the viscosity of an aqueous flooding fluid comprising a corresponding water-soluble polymer that lacks the hydrolyzable cross-links. For example, after injection, the aqueous flooding fluid can have a viscosity of about 1 cPs to about 5000 cPs, e.g., 1 cPs, 5 cPs, 10 cPs, 20 cPs, 30 cPs, 40 cPs, 50 cPs, 60 cPs, 70 cPs, 80 cPs, 90 cPs, 100 cPs, 150 cPs, 200 cPs, 250 cPs, 300 cPs, 350 cPs, 400 cPs, 450 cPs, 500 cPs, 550 cPs, 600 cPs, 650 cPs, 700 cPs, 750 cPs, 800 cPs, 850 cPs, 900 cPs, 950 cPs, 1000 cPs, 1100 cPs, 1200 cPs, 1300 cPs, 1400 cPs, 1500 cPs, 1600 cPs, 1700 cPs, 1800 cPs, 1900 cPs, 2000 cPs, 2100 cPs, 2200 cPs, 2300 cPs, 2400 cPs, 2500 cPs, 2600 cPs, 2700 cPs, 2800 cPs, 2900 cPs, 3000 cPs, 3100 cPs, 3200 cPs, 3300 cPs, 3400 cPs, 3500 cPs, 3600 cPs, 3700 cPs, 3800 cPs, 3900 cPs, 4000 cPs, 4100 cPs, 4200 cPs, 4300 cPs, 4400 cPs, 4500 cPs, 4600 cPs, 4700 cPs, 4800 cPs, 4900 cPs, or 5000 cPs.

Aqueous flooding fluids comprising the water-soluble polymers described above remain water-soluble following introduction into a subterranean formation. After injection into the formation, the environmental conditions of the formation cause the crosslinks in the water-soluble polymers described above to hydrolyze, providing a viscous aqueous flooding fluid. In order for the aqueous flooding fluid to improve the mobility of the oil in the formation and improve the sweep efficiency of the aqueous polymer flood, the water-soluble polymer providing viscosity to the flooding fluid must be able to move unimpeded through the formation, without blocking the pores of the formation.

The mobility control agents, such as the water-soluble polymers described above, therefore remain water-soluble and do not impede the flow of the aqueous flooding fluid in the formation. A recognized laboratory test to measure the ability of an aqueous flooding fluid to move through a subterranean formation without blocking the pores of the formation is called a filter ratio test. An example of this type of test is described in The American Petroleum Institute standards RP 63. In a filter ratio test, a standard volume of an aqueous flooding fluid containing a specific concentration of polymer is passed through a filter under a constant pressure. The time required for the solution to pass through the filter is recorded after specific volumes of solution have passed through the filter. The filter ratio is calculated as the ratio of the filter time for the final portion of solution, over the filter time for the initial, equal-sized portion of solution. Ideally, the aqueous flooding fluid should pass through the filter at a constant rate throughout the test, causing no pore-blocking during filtration, so that the filter ratio should be equal to one. The actual measured filter ratio is typically above one, however, so an upper limit to the filter ratio under a specific set of conditions is normally used in order to determine the suitability of an aqueous flooding fluid for use in a mobility control application.

The aqueous flooding fluid as injected into the well can have a filter ratio of from 1 to about 1.5, from 1 to about 1.4, from 1 to about 1.3, from 1 to about 1.2, or from 1 to about 1.1 when the membrane filter size is 1.2 microns and the pressure is 20 psi.

The aqueous flooding fluid comprises the water-soluble polymers described above and exhibit enhanced shear resistance. Polymers used for mobility control in enhanced oil recovery are typically high molecular weight, non-cross-linked polymers that are sensitive to the shear forces experienced by the polymer-containing aqueous flooding fluid as it is injected into the formation, and as it travels into the formation near the wellbore. Any choke points in this high flow-velocity region can cause a shear-induced, mechanical degradation of the molecular weight of the polymer, resulting in an undesirable reduction in the viscosity of the aqueous flooding fluid. High molecular weight, viscous polymer solutions of the type desirable for mobility control are especially sensitive to shear degradation. Even if engineering measures are taken to minimize the shear degradation of the injected aqueous flooding fluid, a viscosity loss of up to 25% of the initial polymer viscosity upon shearing is not uncommon, and a much greater viscosity loss, up to about 80% or more, is possible.

The shear-induced degradation of the fluid viscosity can be measured using an industry recognized test such as that described in The American Petroleum Institute standards RP 63, where the aqueous flooding fluid is passed through a small orifice under high pressure. The difference in the fluid viscosity before and after the choke point is measured to indicate the amount of shear degradation of the flooding fluid viscosity. Alternatively, a simple blender test can be used to induce the shear degradation of the aqueous flooding fluid. The amount of viscosity loss experienced at increasing shear times in the blender can be measured and used to determine the relative shear stability of flooding fluids comprised of different types of polymers.

The aqueous flooding fluids comprising the water-soluble polymers can display significant shear resistance. For example, when subjected to conditions of shear such as a blender test, the RP 63 standard test, or injection into a subterranean formation, the aqueous flooding fluids of the present invention can undergo a viscosity loss of less than 50%, less than 49%, less than 48%, less than 47%, less than 46%, less than 45%, less than 44%, less than 43%, less than 42%, less than 41%, less than 40%, less than 39%, less than 38%, less than 37%, less than 36%, less than 35%, less than 34%, less than 33%, less than 32%, less than 31%, less than 30%, less than 29%, less than 28%, less than 27%, less than 26%, less than 25%, less than 24%, less than 23%, less than 22%, less than 21%, less than 20%, less than 19%, less than 18%, less than 17%, less than 16%, less than 15%, less than 14%, less than 13%, less than 12%, less than 11%, less than 10%, less than 9%, less than 8%, less than 7%, less than 6%, less than 5%, less than 4%, less than 3%, less than 2%, or less than 1%.

In addition to the water-soluble polymer, an aqueous flooding fluid can further optionally include one or more additives. A suitable additive includes, but is not limited to, an asphaltene inhibitor, a paraffin inhibitor, a corrosion inhibitor, a scale inhibitor, an emulsifier, a water clarifier, a dispersant, an emulsion breaker, a hydrogen sulfide scavenger, a hydrogen sulfide scavenging enhancer, a gas hydrate inhibitor, a biocide, a pH modifier, a surfactant, an antioxidant, or a solvent.

The aqueous flooding fluid can further comprise a corrosion inhibitor. A suitable corrosion inhibitor includes, but is not limited to, an amidoamine, a quaternary amine, an amide, a phosphate ester, or a combination thereof.

The aqueous flooding fluid can further comprise a scale inhibitor. A suitable scale inhibitor includes, but is not limited to, a phosphate, a phosphate ester, a phosphoric acid, a phosphonate, a phosphonic acid, a polyacrylamide, a salt of acrylamido-methyl propane sulfonate/acrylic acid copolymer (AMPS/AA), a phosphinated maleic copolymer (PHOS/MA), a salt of a polymaleic acid/acrylic acid/acrylamido-methyl propane sulfonate terpolymer (PMA/AMPS), or a combination thereof.

The aqueous flooding fluid can further comprise an emulsifier. A suitable emulsifier includes, but is not limited to, a salt of a carboxylic acid, a product of an acylation reaction between a carboxylic acid or a carboxylic anhydride and an amine, an alkyl, an acyl or an amide derivative of a saccharide (an alkyl-saccharide emulsifier), or a combination thereof.

The aqueous flooding fluid can further comprise a water clarifier. A suitable water clarifier can include, but is not limited to, an inorganic metal salt such as alum, aluminum chloride, and aluminum chlorohydrate, or an organic polymer such as an acrylic acid based polymer, an acrylamide based polymers, a polymerized amine, an alkanolamine, a thiocarbamate, and a cationic polymer such as diallyldimethylammonium chloride (DADMAC).

The aqueous flooding fluid can further comprise a dispersant. A suitable dispersant can include, but is not limited to, an aliphatic phosphonic acid with 2-50 carbons, such as hydroxyethyl diphosphonic acid, and an aminoalkyl phosphonic acid, e.g. a polyaminomethylene phosphonate with 2-10 N atoms e.g. each bearing at least one methylene phosphonic acid group; examples of the latter are ethylenediamine tetra(methylene phosphonate), diethylenetriamine penta(methylene phosphonate) and the triamine- and tetramine-polymethylene phosphonates with 2-4 methylene groups between each N atom, at least two of the numbers of methylene groups in each phosphonate being different.

Other suitable dispersion agents include lignin or a derivative of lignin such as lignosulfonate and naphthalene sulfonic acid and a derivative.

The aqueous flooding fluid can further comprise an emulsion breaker. A suitable emulsion breaker can include, but is not limited to, dodecylbenzylsulfonic acid (DDBSA), the sodium salt of xylenesulfonic acid (NAXSA), an epoxylated and propoxylated compound, an anionic surfactant, a cationic surfactant, a nonionic surfactant, a resin, such as a phenolic resin or epoxide resin.

The aqueous flooding fluid can further comprise a hydrogen sulfide scavenger. A suitable additional hydrogen sulfide scavenger can include, but is not limited to, an oxidant (e.g., an inorganic peroxide such as sodium peroxide, or chlorine dioxide), an aldehyde (e.g., of 1-10 carbons such as formaldehyde or glutaraldehyde or (meth)acrolein), a triazine (e.g., monoethanol amine triazine, and monomethylamine triazine), glyoxal, or a combination thereof. Adding MMA triazines can reduce or eliminate offensive MMA odors.

The aqueous flooding fluid can further comprise a gas hydrate inhibitor. A suitable gas hydrate inhibitor can include, but is not limited to, a thermodynamic inhibitor (THI), a kinetic inhibitor (KHI), an anti-agglomerate (AA), or a combination thereof. A suitable thermodynamic inhibitor can include, but is not limited to, a NaCl salt, a KCl salt, a $CaCl_2$ salt, a $MgCl_2$ salt, a $NaBr_2$ salt, a formate brine (e.g. potassium formate), a polyol (such as glucose, sucrose, fructose, maltose, lactose, gluconate, monoethylene glycol, diethylene glycol, triethylene glycol, mono-propylene glycol, dipropylene glycol, tripropylene glycol, tetrapropylene glycol, monobutylene glycol, dibutylene glycol, tributylene glycol, glycerol, diglycerol, triglycerol, a sugar alcohol (e.g. sorbitol, mannitol)), methanol, propanol, ethanol, a glycol ether (such as diethyleneglycol monomethyl ether, ethylene glycol monobutyl ether), an alkyl or cyclic ester of an alcohol (such as ethyl lactate, butyl lactate, methylethyl benzoate), or a combination thereof. A suitable kinetic inhibitor and an anti-agglomerate includes, but is not limited to, a polymer, a copolymers, a polysaccharide (such as hydroxy-ethylcellulose (HEC), carboxymethylcellulose (CMC), starch, starch derivatives, and xanthan), a lactam (such as polyvinylcaprolactam, polyvinyl lactam), a pyrrolidone (such as polyvinyl pyrrolidone of various molecular weights), a surfactant (such as a fatty acid salt, an ethoxylated alcohol, a propoxylated alcohol, a sorbitan ester, an ethoxylated sorbitan ester, a polyglycerol ester of a fatty acid, an alkyl glucoside, an alkyl polyglucoside, an alkyl sulfate, an alkyl sulfonate, an alkyl ester sulfonate, an alkyl aromatic sulfonate, an alkyl betaine, an alkyl amido betaine), a hydrocarbon based dispersant (such as a lignosulfonate, an iminodisuccinate, a polyaspartate), an amino acid, a proteins, or a combination thereof.

The aqueous flooding fluid can further comprise a biocide. Any biocide suitable in oilfield operations can be used. A biocide can be included in a composition in an amount of about 0.1 ppm to about 1000 ppm, e.g., 0.1 ppm, 0.5 ppm, 1 ppm, 2 ppm, 3 ppm, 4 ppm, 5 ppm, 6 ppm, 7 ppm, 8 ppm, 9 ppm, 10 ppm, 20 ppm, 30 ppm, 40 ppm, 50 ppm, 60 ppm, 70 ppm, 80 ppm, 90 ppm, 100 ppm, 200 ppm, 300 ppm, 400 ppm, 500 ppm, 600 ppm, 700 ppm, 800 ppm, 900 ppm, or 1000 ppm.

A suitable biocide includes, but is not limited to, an oxidizing or a non-oxidizing biocide. A suitable non-oxidizing biocide includes, for example an amine compound (e.g., a quaternary amine compound and cocodiamine), a halogenated compound (e.g., bronopol and 2-2-dibromo-3-nitrilopropionamide (DBNPA)), a sulfur compound (e.g., isothiazolone, a carbamate, and metronidazole), and a quaternary phosphonium salt (e.g., tetrakis(hydroxymethyl)phosphonium sulfate (THPS)). A suitable oxidizing biocide includes, for example, sodium hypochlorite, trichloroisocyanuric acid, dichloroisocyanuric acid, calcium hypochlorite, lithium hypochlorite, a chlorinated hydantoin, stabilized sodium hypobromite, activated sodium bromide, a brominated hydantoin, chlorine dioxide, ozone, a peroxide, or a combination thereof.

The aqueous flooding fluid can further comprise a pH modifier. A suitable pH modifier includes, but is not limited to, an alkali hydroxide, an alkali carbonate, an alkali bicarbonate, an alkaline earth metal hydroxide, an alkaline earth metal carbonate, an alkaline earth metal bicarbonate, or a combination thereof. Exemplary pH modifiers include NaOH, KOH, $Ca(OH)_2$, CaO, $Na_2CO_3$, $KHCO_3$, $K_2CO_3$, $NaHCO_3$, MgO, and $Mg(OH)_2$.

The aqueous flooding fluid can further comprise a surfactant. The surfactant can be a cationic surfactant, an anionic surfactant, an amphoteric surfactant, a zwitterionic surfactant, or a non-ionic surfactant. A surfactant can aid in improving the recovery of oil from the formation. A surfactant can be included in an aqueous flooding fluid in an amount of about 100 ppm to about 10000 ppm, e.g., 100 ppm, 200 ppm, 300 ppm, 400 ppm, 500 ppm, 600 ppm, 700 ppm, 800 ppm, 900 ppm, 1000 ppm, 2000 ppm, 3000 ppm, 4000 ppm, 5000 ppm, 6000 ppm, 7000 ppm, 8000 ppm, 9000 ppm, or 10000 ppm.

A suitable surfactant includes, but is not limited to, an anionic surfactant, a cationic surfactant, or a nonionic surfactant. An anionic surfactant can be an alkyl aryl sulfonate, an olefin sulfonate, a paraffin sulfonate, an alcohol sulfate, an alcohol ether sulfate, an alkyl carboxylate, an alkyl ether carboxylate, an alkyl and ethoxylated alkyl phosphate ester, a mono- and di-alkyl sulfosuccinate and sulfosuccinamate, an alkyl or alkyl ether sulfate and sulfonate, such as a $C_{14}$-$C_{24}$ alpha olefin sulfonate, a $C_{13}$-$C_{18}$ alcohol ether sulfate, a $C_{15}$-$C_{17}$ internal olefin sulfonate, or a $C_{12}$-$C_{18}$ ester sulfonate.

A cationic surfactant can be an alkyl trimethyl quaternary ammonium salt, an alkyl dimethyl benzyl quaternary ammonium salt, a dialkyl dimethyl quaternary ammonium salt, an imidazolinium salt, or a combination thereof.

A nonionic surfactant can be an alcohol alkoxylate, an alkylphenol alkoxylate, a block copolymer of ethylene, propylene and butylene oxide, an alkyl dimethyl amine oxide, an alkyl-bis(2-hydroxyethyl) amine oxide, an alkyl amidopropyl dimethyl amine oxide, an alkylamidopropyl-bis(2-hydroxyethyl) amine oxide, an alkyl polyglucoside, a polyalkoxylated glyceride, a sorbitan ester, a polyalkoxylated sorbitan ester, an alkoyl polyethylene glycol ester and diester. Also included are a betaine and a sultane, an amphoteric surfactant such as an alkyl amphoacetate and an amphodiacetate, an alkyl amphopropionate and an amphodipropionate, an alkyliminodipropionate, or a combination thereof.

The aqueous flooding fluid can further comprise a solvent. A suitable solvent includes, but is not limited to, water, isopropanol, methanol, ethanol, 2-ethylhexanol, heavy aromatic naphtha, toluene, ethylene glycol, ethylene glycol monobutyl ether (EGMBE), diethylene glycol monoethyl ether, xylene, or a combination thereof. Representative polar solvents suitable for formulation with the composition include water, brine, seawater, an alcohol (including straight chain or branched aliphatic such as methanol, ethanol, propanol, isopropanol, butanol, 2-ethylhexanol, hexanol, octanol, decanol, 2-butoxyethanol, etc.), a glycol or a derivative (ethylene glycol, 1,2-propylene glycol, 1,3-propylene glycol, ethylene glycol monobutyl ether, etc.), a ketone (cyclohexanone, diisobutylketone), N-methylpyrrolidinone (NMP), N,N-dimethylformamide, and the like. A representative non-polar solvent suitable for formulation with the composition include an aliphatic such as pentane, hexane, cyclohexane, methylcyclohexane, heptane, decane, dodecane, diesel, and the like; an aromatic such as toluene, xylene, heavy aromatic naphtha, a fatty acid derivative (an acid, an ester, an amide), and the like.

The solvent can be monoethyleneglycol, methanol, dimethyl sulfoxide (DMSO), dimethylformamide (DMF), tetrahydrofuran (THF), or a combination thereof.

The aqueous flooding fluid can further comprise a compound that enhances the hydrogen sulfide scavenging performance of the composition. This compound can be a quaternary ammonium compound, an amine oxide, an ionic or non-ionic surfactant, or a combination thereof. A suitable quaternary amine compound can include, but is not limited to, alkyl benzyl ammonium chloride, benzyl cocoalkyl($C_{12}$-$C_{18}$)dimethylammonium chloride, dicocoalkyl ($C_{12}$-$C_{18}$)dimethylammonium chloride, ditallow dimethylammonium chloride, di(hydrogenated tallow alkyl)dimethyl quaternary ammonium methyl chloride, methyl bis(2-hydroxyethyl cocoalkyl($C_{12}$-$C_{18}$) quaternary ammonium chloride, dimethyl(2-ethyl) tallow ammonium methyl sulfate, n-dodecylbenzyldimethylammonium chloride, n-octadecylbenzyldimethyl ammonium chloride, n-dodecyltrimethylammonium sulfate, soya alkyltrimethylammonium chloride, hydrogenated tallow alkyl (2-ethylhyexyl) dimethyl quaternary ammonium methyl sulfate, or a combination thereof.

A suitable amine oxide compound can include, but is not limited to, a fatty amine oxide such as stearyl dimethylamine oxide, lauryldimethylamine oxide, cocamidopropylamine oxide, an etheramine oxide such as bis-(2-hydroxyethyl) isodecyloxypropylamine oxide, or a combination thereof. A suitable nonionic surfactant can include, but is not limited to, a polyoxyethylene glycol alkyl ether, a polyoxypropyleneglycol alkyl ether, a polyoxyethyleneglycol nonylphenol ether, a poloxamer, cocamide diethanolamine, polyethoxylated tallow amine, or a combination thereof.

These compounds can be present from about 0.01 to about 20 percent by weight, from about 1 to about 10 percent by weight, from about 2 to about 9 percent by weight, from about 3 percent to about 8 percent by weight, from about 4 percent to about 7 percent by weight, or from about 5 percent to about 6 percent by weight.

The hydrogen sulfide scavenging enhancer compound can be added to a fluid or gas simultaneously with the aqueous flooding fluid, or it can be added separately.

The aqueous flooding fluid can further comprise an asphaltene inhibitor. A suitable asphaltene inhibitor includes, but is not limited to, an aliphatic sulfonic acid; an alkyl aryl sulfonic acid; an aryl sulfonate; a lignosulfonate; an alkylphenol/aldehyde resin and a similar sulfonated resin; a polyolefin ester; a polyolefin imide; a polyolefin ester with an alkyl, alkylenephenyl or alkylenepyridyl functional group; a polyolefin amide; a polyolefin amide with an alkyl, alkylenephenyl or alkylenepyridyl functional group; a polyolefin imide with an alkyl, alkylenephenyl or alkylenepyridyl functional group; an alkenyl/vinyl pyrrolidone copolymer; a graft polymer of a polyolefin with maleic anhydride or vinyl imidazole; a hyperbranched polyester amide; a polyalkoxylated asphaltene, an amphoteric fatty acid, a salt of an alkyl succinate, a sorbitan monooleate, a polyisobutylene succinic anhydride, or a combination thereof.

The aqueous flooding fluid can further comprise a paraffin inhibitor. A suitable paraffin inhibitor includes, but is not limited to, a paraffin crystal modifier, a dispersant/crystal modifier combination, or a combination thereof. A suitable paraffin crystal modifier include, but is not limited to, an alkyl acrylate copolymer, an alkyl acrylate vinylpyridine copolymer, an ethylene vinyl acetate copolymer, a maleic anhydride ester copolymer, a branched polyethylene, naphthalene, anthracene, microcrystalline wax, an asphaltene, or a combination thereof. A suitable dispersant includes, but is not limited to, dodecyl benzene sulfonate, an oxyalkylated alkylphenol, an oxyalkylated alkylphenolic resin, or a combination thereof.

The aqueous flooding fluid can further comprise an antioxidant. Any antioxidant suitable in oilfield operations can be used. An exemplary antioxidant includes, but is not limited to a sulfite, a thiocyanate, a thiosulfate, or a combination there of. An antioxidant can be included in a composition in an amount of about 1 ppm to about 1000 ppm, e.g., 1 ppm, 2 ppm, 3 ppm, 4 ppm, 5 ppm, 6 ppm, 7 ppm, 8 ppm, 9 ppm, 10 ppm, 20 ppm, 30 ppm, 40 ppm, 50 ppm, 60 ppm, 70 ppm, 80 ppm, 90 ppm, 100 ppm, 200 ppm, 300 ppm, 400 ppm, 500 ppm, 600 ppm, 700 ppm, 800 ppm, 900 ppm, or 1000 ppm.

Compositions made according to the invention can further include additional functional agents or additives that provide a beneficial property. Additional agents or additives will vary according to the aqueous flooding fluid being manufactured and its intend use as one skilled in the art will appreciate.

Having described the invention in detail, it will be apparent that modifications and variations are possible without departing from the scope of the invention defined in the appended claims.

EXAMPLES

The following non-limiting examples are provided to further illustrate the present invention. All reagents were purchased from commercial sources and used as received unless stated otherwise.

Example 1: General Procedure for Preparing Polyacrylamide Products

A poly(acrylate-acrylamide) polymer was produced by polymerizing a water-in-oil emulsion including an aqueous monomer phases and an external hydrocarbon oil phase. The monomer phase included an aqueous mixture of an acrylamide solution, acrylic acid or 2-acrylamide-2-methylpropane sulfonic acid sodium salt, diacetone acrylamide, and de-ionized water neutralized in an ice bath with a sodium hydroxide solution to pH 5.0-8.5. In addition, a chain transfer agent of sodium formate, sodium chloride, and a chelant of ethylenediamine tetraacetic acid (EDTA) were added to the monomer phase. The hydrazide crosslinker was then added to the neutralized monomer phases and mixed for 30-60 minutes at 25° C. The oil phase included a hydrocarbon oil and one or more surfactants.

The emulsion was formed by adding the monomer phase to the oil phase under agitation at 38 to 44° C. and mixing for a minimum of 30 minutes.

The polymerization was initiated by addition of 2,2'-azobisisobutryonitrile and 2,2'-azobis(2,4-diemthylvaleronitrile) and purging of nitrogen at the reaction temperature of 38 to 44° C. After the polymerization reaction reached ≥85% conversion, the emulsion was post-heated at 57° C. or above for at least one hour to complete the polymerization and reduce monomer residuals. The hydrazide crosslinker could, alternatively, be added after the polymerization reaction.

The structure of the hydrazide-derived crosslinked polymer was confirmed by a combination of electrospray ionization mass spectrometry (ESI-MS) and nuclear magnetic resonance (NMR) spectroscopy.

Dissolution of the polymer emulsion in synthetic sea salt water was affected by mixing the emulsion into the sea salt water under shear, in the presence of a high hydrophilic/lipophilic balance (HLB) nonionic surfactant at a concentration of less than 10% of the weight of the emulsion polymer. Part of the fresh made-down polymer solution was used right away for filter ratio determination and bulk viscosity measurement. Another part of the polymer solution was activated in an oven at 50 to 70° C. for 16 to 168 hours for the filter ratio determination and bulk viscosity measurement. Filter ratio determination and bulk viscosity measurements were performed prior to and after activation.

Alternatively, an ethoxylated fatty alcohol could be added directly to the polymer emulsion after cooling to room temperature. Filter ratio determination and bulk viscosity measurement can be performed following the addition of the ethoxylated fatty alcohol to ensure the crosslinked polymer was dispersed within the aqueous solution.

Example 2: Preparation of Product A

Product A was produced by following the general procedure as described in Example 1. The monomer phase consisted of 377.80 g of a 49.5% acrylamide solution, 77.5 g acrylic acid, and 115.92 g de-ionized water. While mixing, 0.35 g sodium formate and 20.0 g sodium chloride were added. The pH of the solution was adjusted to about 7.0 using a 50% sodium hydroxide solution. After neutralization, 5.0 g diacetone acrylamide, 0.1 g adipic acid dihydrazide, and 0.13 g EDTA were added to the monomer phase. The monomer phase was stirred for another 30 minutes. The oil phase consisted of 7.50 g sorbitan sesquioleate, 26.4 g TWEEN 81, and 250.0 g paraffinic oil.

Part of the polymer solution in synthetic sea salt water was activated in an oven at 70° C. for 16 hours for the filter ratio determination and bulk viscosity measurement.

Example 3: Preparation of Product B

Product B was produced by following the general procedure as described in Example 1. The monomer phase consisted of 377.80 g of a 49.5% acrylamide solution, 77.5 g acrylic acid, and 115.92 g de-ionized water. While mixing, 0.35 g sodium formate and 20.0 g sodium chloride were added. The pH of the solution was adjusted to about 7.0 using a 50% sodium hydroxide solution. After neutralization, 5.0 g diacetone acrylamide, and 0.13 g EDTA were added to the monomer phase. The monomer phase was stirred for another 30 minutes. The oil phase consisted of 7.50 g sorbitan sesquioleate, 26.4 g TWEEN 81, and 250.0 g paraffinic oil. For post-polymerization crosslinked samples, after polymerization, an aqueous solution of adipic acid dihydrazide was added directly to the latex. The latex was stirred from 30 minutes and then aged for 24 hours prior to filter ratio determination and bulk viscosity.

Example 4: Preparation of Product C

Product C was produced by following the general procedure as described in Example 1. The monomer phase consisted of 377.80 g of a 49.5% acrylamide solution, 77.5 g acrylic acid, and 115.92 g de-ionized water. While mixing, 0.35 g sodium formate and 20.0 g sodium chloride were added. The pH of the solution was adjusted to about 7.0 using a 50% sodium hydroxide solution. After neutralization, 5.0 g diacetone acrylamide, 0.025 g carbohydrazide, and 0.13 g EDTA were added to the monomer phase. The monomer phase was stirred for another 30 minutes. The oil phase consisted of 7.50 g sorbitan sesquioleate, 26.4 g TWEEN 81, and 250.0 g paraffinic oil.

Part of the polymer solution in synthetic sea water was activated in an oven at 70° C. for 16 hours for the filter ratio determination and bulk viscosity measurement.

Example 5: Preparation of Product D

Product D was produced by following the general procedure as described in Example 1. The monomer phase consisted of 274.59 g of a 49.5% acrylamide solution, 251.63 g of a 58% 2-acrylamido-2-methylpropane sulfonic acid sodium salt solution, and 142.98 g de-ionized water. While mixing, 0.15 g sodium formate and 20.0 g sodium chloride were added. The pH of the solution was adjusted to about 7.0 using a 2% sodium hydroxide solution. After neutralization, 5.0 g diacetone acrylamide, 0.2 g adipic acid dihydrazide, and 0.13 g EDTA were added to the monomer phase. The monomer phase was stirred for another 30 minutes. The oil phase consisted of 8.50 g SPAN 80, 26.5 g TWEEN 81, and 250.0 g paraffinic oil.

Part of the polymer solution in synthetic sea salt water was activated in an oven at 65° C. for 40 hours for the filter ratio determination and bulk viscosity measurement.

Example 6: Filter Ratios of Products A-D

The apparatus used to measure the filter ratio of flooding fluids was constructed of a steel ball and housing unit fitted with a gasket-sealed top possessing fittings for nitrogen pressurization and a gasket-sealed bottom connected to a filter and outlet. The filter membranes are made of mixed cellulose ethers with a pore diameter ranging from 1.2 to 8.0 microns. Approximately, 250 g of a 1000 ppm solution in synthetic sea salt water of each product emulsion was added to the cylinder. After a few mLs of solution were allowed to pass through in order to wet the filter, the time required for an initial 30 mL volume of solution to pass through the filter, under a head pressure of 20 psi, was measured. Then about 100 mL additional solution was allowed to pass through the filter. Finally, the time required for a final 30 mL solution to pass through the filter was measured. The ratio of the final to initial filter times was recorded as the filter ratio.

The filter ratios for both fresh and activated polymer solutions were determined using the method above. The method used conforms closely to the American Petroleum Institute standard (API 63). Bulk viscosities for both solutions were measured in a programmable viscometer at 25° C. and performed at 10 s$^{-1}$ shear rate.

Data for products A-D as described in Examples 1-6, above, are listed in Table 1, below.

TABLE 1

Filter ratios for Product A-D

| Product | Filter ratio (5.0 μm) | Filter ratio (1.2 μm) | Activation Filter ratio (5.0 μm) | Activation Filter ratio (1.2 μm) | Particle Size (μm) |
|---|---|---|---|---|---|
| A | 1.03 | 1.12 | 1.02 | 1.12 | 0.49 |
| B | 1.00 | 1.07 | 1.10 | — | 0.59 |
| C | 1.06 | 1.15 | — | — | 0.59 |
| D | 1.00 | 1.05 | — | — | 0.69 |

Filter ratios below 1.2 are considered passing.

Example 7: Brookfield Viscosity Tests

Figure 2:
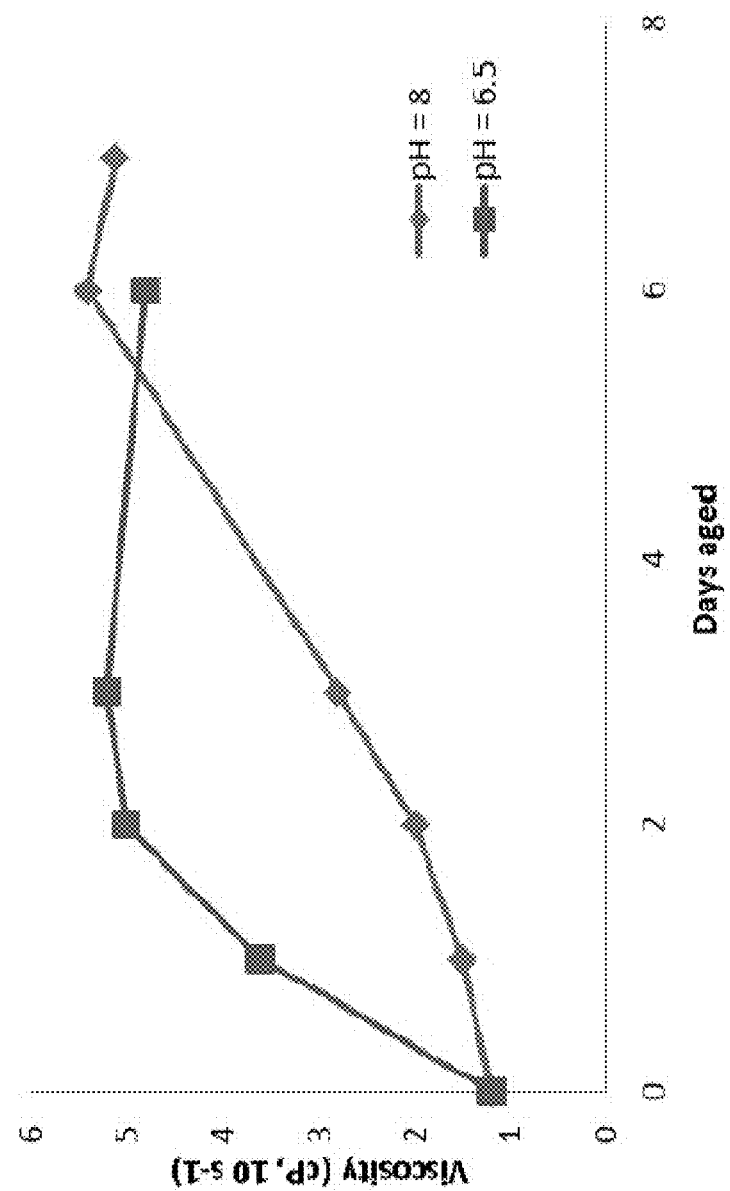
FIG. 2 is a graph of viscosity at 10 $s^{-1}$ (cP) versus days aged at 50° C. for product A (1000 ppm polymer, synthetic sea water) at pH 6.5 and 8.

Products A-D and an anionic polyacrylamide polymer crosslinked with glyoxal (identified as Polymer E hereinafter) were tested. In these tests, the polymers were prepared in synthetic sea salt water at a final concentration of 1,000 ppm. Real-time viscosity measurements to determine polymer activation were made using an Anton-Paar modulator compact rheometer. Measurements were obtained using the double-gap concentric cylinder geometry. The viscosity of oven aged samples (i.e., FIG. 2) were measured using a Brookfield viscometer equipped with an ultra-low viscosity adapter (ULA).

During activation measurements, the solution temperature was increased from 25° C. to the desired peak temperature at a rate of 3° C./minute. Once the peak temperature was reached, the temperature was held and the viscosity was measured at a continuous shear rate of 10 s$^{-1}$.

The activation profile of product A at various temperatures is visually depicted in FIG. 1. It can be seen that the rate of crosslink degradation is temperature dependent. As the temperature increases, the rate of hydrolysis also increases.

The performance of product A in different sea water conditions (pH 6.5 and 8) were compared. At pH 6.5, a solution of product A (1,000 ppm) reached full viscosity after 2 days, whereas at pH 8, full viscosity was reached after 6 days. The results are visually depicted in FIG. 2.

Figure 3:
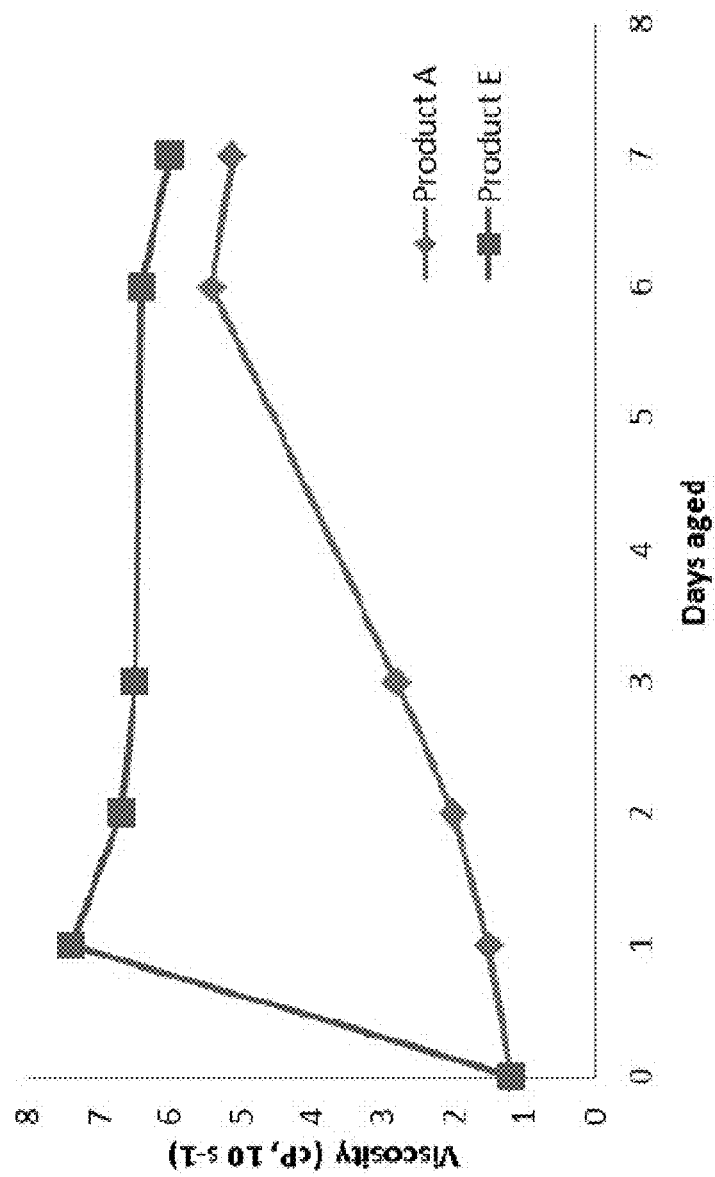
FIG. 3 is a graph of viscosity at 10 $s^{-1}$ (cP) versus days aged 50° C. for products A and E (1000 ppm polymer, synthetic sea water) at pH 8.

The performance of product A was compared to product E; both samples were compared in synthetic sea water at pH 8. Product A reached full viscosity after 6 days, whereas product E reached full viscosity after 1 day. The results are visually depicted in FIG. 3.

Figure 4:
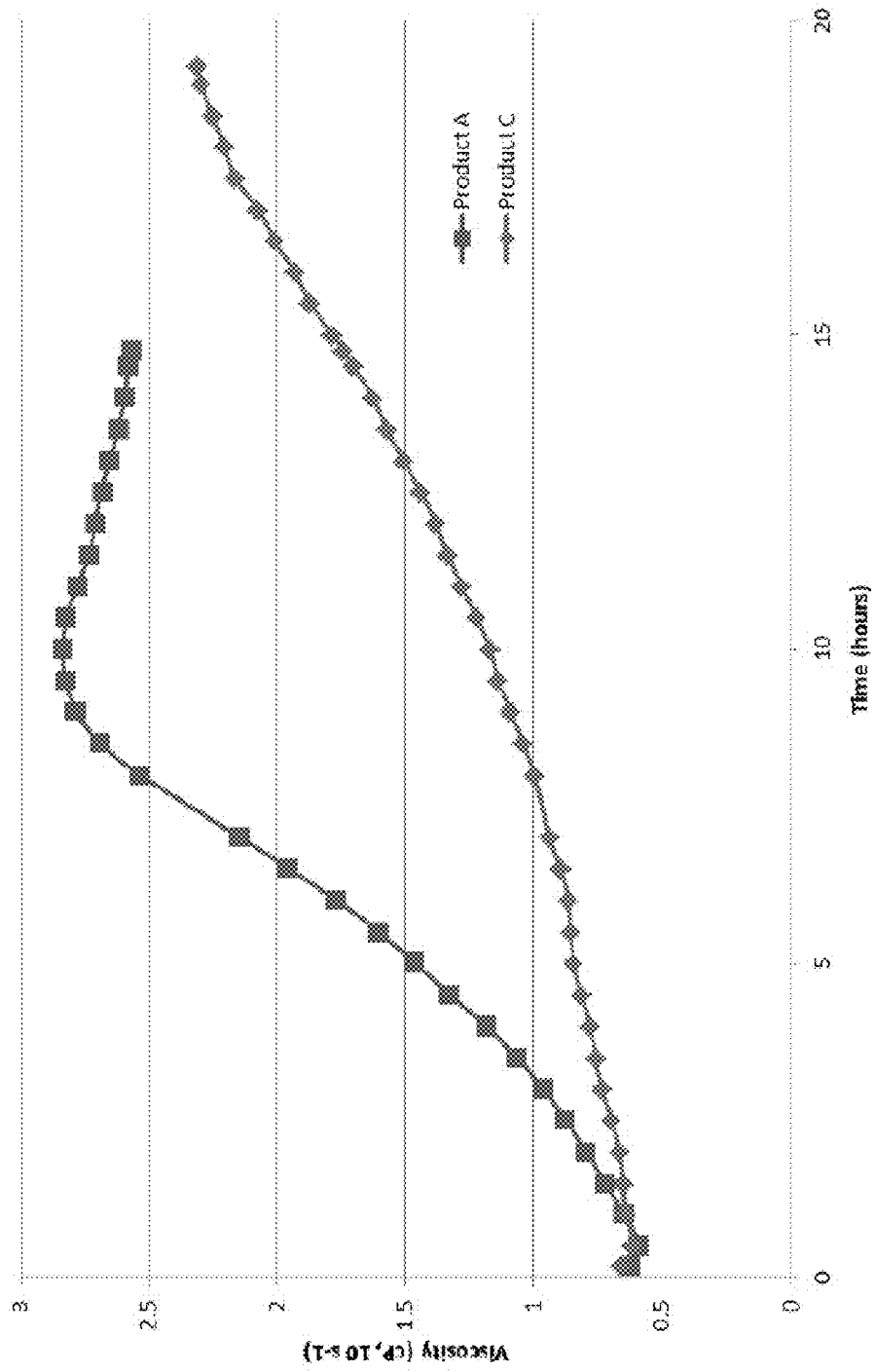
FIG. 4 is a graph of viscosity at 10 $s^{-1}$ (cP) versus time in hours 65° C. for products A and C (1000 ppm polymer, synthetic sea water).

The performance difference between two crosslinkers, adipic acid hydrazide and carbohydrazide, in products A and C, respectively, was compared. Despite product A being dosed with two-fold molar excess of crosslinker, product A activated after 10 hours at 65° C., while product C activated after 19 hours. The results are visually depicted in FIG. 4.

Figure 5:
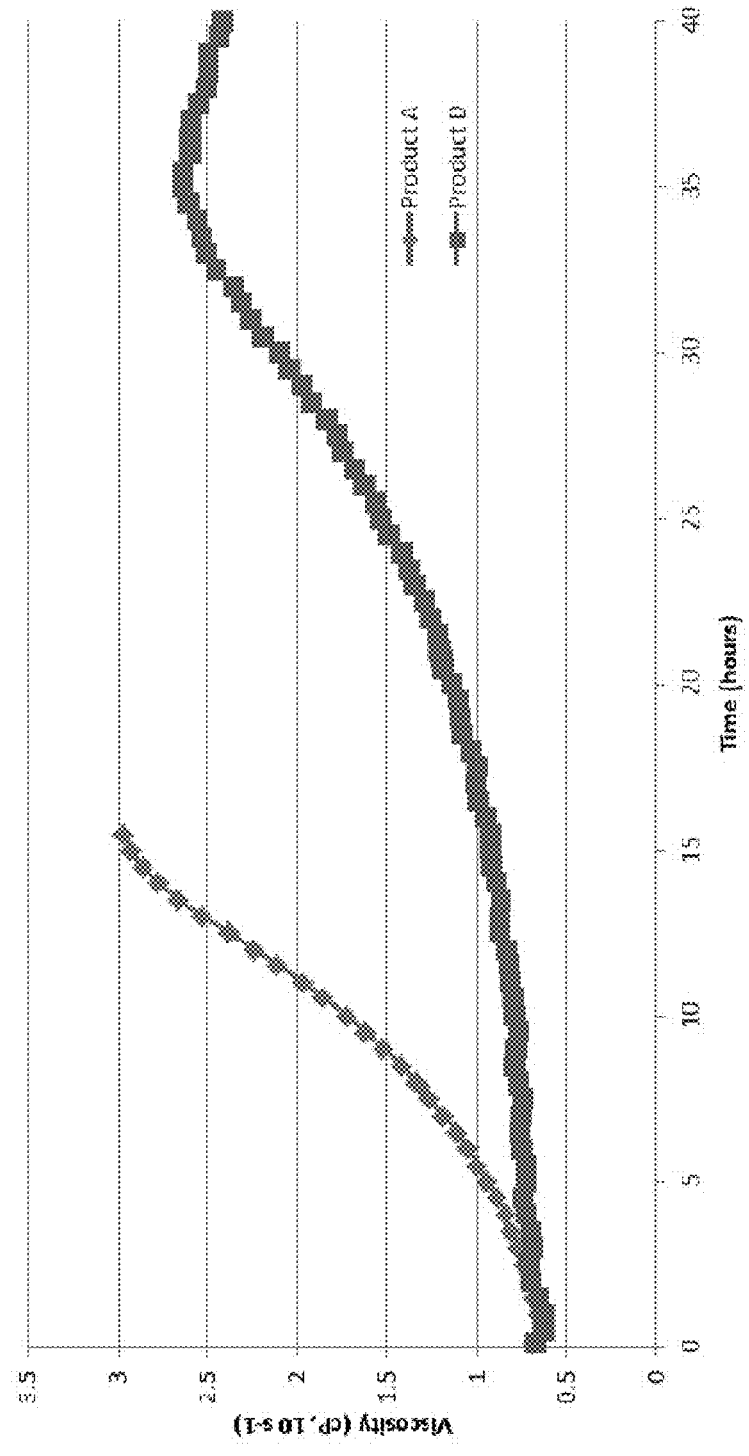
FIG. 5 is a graph of viscosity at 10 $s^{-1}$ (cP) versus time in hours at 60° C. for products A and D (1000 ppm polymer, synthetic sea water).

The performance difference between different backbones, 30 mol. % sodium-acrylate/acrylamide and 25% acrylamide tertiary butyl sulfonic acid/acrylamide, in products in A and D, respectively, were compared. The timing of peak viscosity was changed from 15 to 30 hours by substituting in an acrylamide tertiary butyl sulfonic acid backbone into polymer D. The results are visually depicted in FIG. 5.

Figure 6:
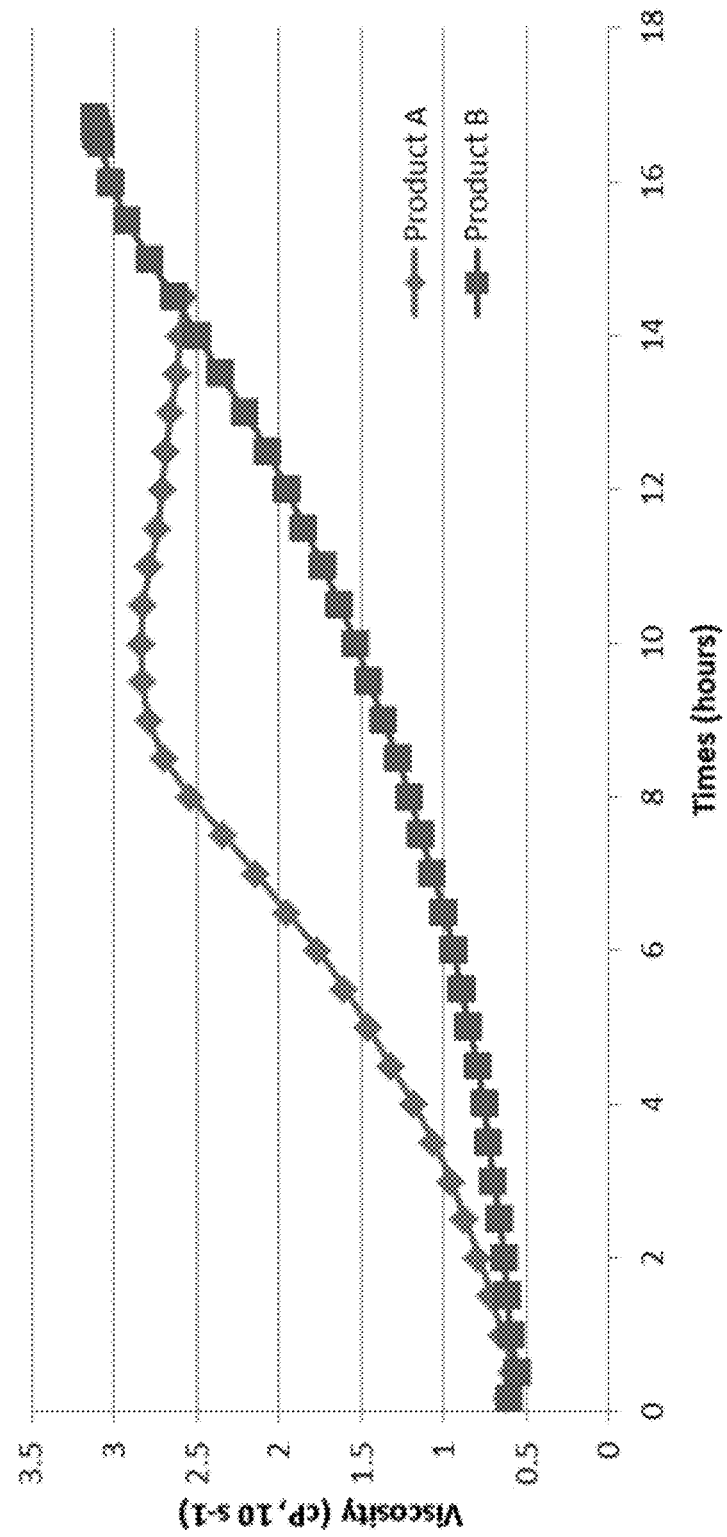
FIG. 6 is a graph of viscosity at 10 $s^{-1}$ (cP) versus time in hours at 65° C. for product A where the polymer was crosslinked either during backbone polymerization (pre) and product B, which was crosslinked after backbone polymerization (post).

The performance difference between the timing of crosslinker addition, adding to the monomer phase, product A, or pre-polymerized product, product B, was compared. When the crosslinker was added to the monomer phase, full viscosity was reached after about 9 hours; whereas, when the crosslinker was added to the polymerized polymer, full viscosity was reached after about 16 hours. The results are visually depicted in FIG. 6.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and methods without departing from the scope of the invention, it is intended that all matter contained in the above description and shown in the accompanying drawings shall be interpreted as illustrative and not in a limiting sense.

What is claimed is:

1. A method for increasing recovery of crude oil from a subterranean hydrocarbon-containing formation, the method comprising injecting an aqueous flooding fluid into a well that is in contact with the subterranean hydrocarbon-containing formation, the aqueous flooding fluid comprising injection water and a mobility control agent, the mobility control agent comprising a crosslinked water-soluble polymer,
wherein the crosslinking units are derived from a multifunctional hydrazide, a multifunctional amine, a multifunctional hydroxylamine, or a combination thereof and degrade to form a water-soluble polymer having fewer crosslinks and
wherein the mobility control agent does not block the pores of the subterranean hydrocarbon-containing formation and an aqueous flooding fluid comprising the water-soluble polymer with fewer crosslinks has a higher viscosity than the aqueous flooding fluid comprising the crosslinked water-soluble polymer.

2. The method of claim 1, wherein the crosslinking units are derived from the multifunctional hydrazide.

3. The method of claim 1, wherein the water-soluble polymer comprises a carbonyl group, and the crosslinks within the crosslinked water-soluble polymer are derived from reaction of the multifunctional hydrazide with the carbonyl group of the water-soluble polymer, wherein the crosslinks are degraded after the aqueous flooding fluid comprising the crosslinked water-soluble polymer is contacted with the hydrocarbon-containing formation to form the aqueous flooding fluid comprising the water-soluble polymer having fewer crosslinks.

4. The method of claim 1, wherein the water-soluble polymer comprising a carbonyl group is an uncrosslinked water-soluble polymer.

5. The method of claim 1, wherein the crosslinked water-soluble polymer comprises crosslinking units derived from a hydrazide corresponding to Formulae I or II:

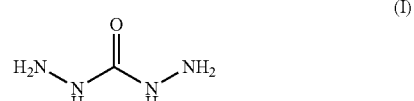

(I)

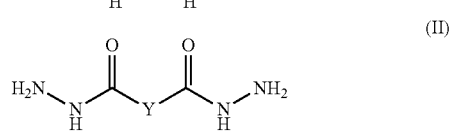

(II)

wherein
Y is a bond, $C_2$-$C_{18}$ alkylene, $C_2$-$C_{18}$ alkenylene, arylene, or alkarylene.

6. The method of claim 5, wherein Y is a bond, ethylene, or butylene.

7. The method of claim 5, wherein the water-soluble polymer comprises a repeat unit derived from acrylic acid, an acrylic acid salt, a methacrylic acid salt, methacrylic acid, diacetone acrylamide, acrylamide, a 2-acrylamido-2-methylpropane sulfonic acid salt, or a combination thereof.

8. The method of claim 5, wherein the crosslinks within the crosslinked water-soluble polymer are formed (a) prior to polymerization, (b) during polymerization, or (c) after polymerization.

9. The method of claim 8, wherein the crosslinked water-soluble polymer comprises about 0.1 ppm to about 2000 ppm covalently bonded crosslinking units based on the total weight of the water-soluble polymer.

10. The method of claim 9, wherein the weight average molecular weight of the uncrosslinked water-soluble polymer is from about 4 MDa to about 20 MDa.

11. The method of claim 1, wherein the aqueous flooding fluid as injected into the well has a filter ratio of from 1 to about 1.5 at 1000 ppm polymer concentration when the membrane filter size is less than 5.0 microns.

12. The method of claim 11, wherein the membrane filter size is 1.2 microns.

13. The method of claim 1, wherein the aqueous flooding fluid comprises about 100 ppm to about 10000 ppm of the water-soluble polymer.

14. The method of claim 1, wherein prior to injection, the aqueous flooding fluid has a viscosity of about 0 cPs to about 100 cPs.

15. The method of claim 1, wherein after injection, the aqueous flooding fluid has a viscosity of about 1 cPs to about 5000 cPs.

16. A composition comprising water and a crosslinked water-soluble polymer, wherein the crosslinked water-soluble polymer is derived from a multifunctional hydrazide and a carbonyl functionality present in an uncrosslinked water-soluble polymer, and the weight number average molecular weight of the uncrosslinked water-soluble polymer is from about 5 MDa to about 20 MDa as determined by multi-angle light scattering (MALS).

17. The composition of claim 16, wherein the uncrosslinked water-soluble polymer comprises a repeat unit derived from acrylic acid, an acrylic acid salt, a (meth)acrylic acid salt, (meth)acrylic acid, diacetone acrylamide, acrylamide, a 2-acrylamido-2-methylpropane sulfonic acid salt, or a combination thereof.

18. A crosslinked polymer wherein the polymer is derived from a 2-acrylamido-2-methylpropane sulfonic acid salt, a styrene sulfonic acid salt, 2-(acryloyloxy)-N,N,N-trimethylethanaminium salt, N,N-dimethylaminoethyl acrylate methyl chloride quaternary salt, N,N-dimethylaminoethyl methacrylate methyl chloride quaternary salt, N,N-dimethylaminopropyl acrylamide methyl chloride quaternary salt, N,N-dimethylaminopropyl methacrylamide methyl chloride quaternary salt, N-vinylformamide, N-vinylpyrrolidinone, diallyldimethyl ammonium chloride, or a combination thereof; and the crosslinking units are derived from a hydrazide corresponding to Formulae I or II:

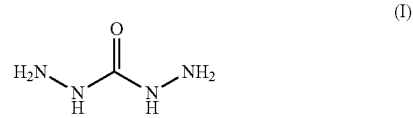

(I)

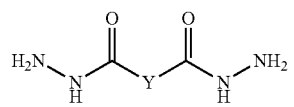
wherein Y is a bond, $C_2$-$C_{18}$ alkylene, or $C_2$-$C_{18}$ alkenylene, arylene, or alkarylene.
19. The crosslinked polymer of claim 18, wherein the polymer is derived from a 2-acrylamido-2-methylpropane sulfonic acid salt, a styrene sulfonic acid salt, or a combination thereof.
* * * * *